United States Patent [19]
Kawatani et al.

[11] Patent Number: 4,544,414
[45] Date of Patent: Oct. 1, 1985

[54] SELF-EMULSIFYING SIZING COMPOSITION

[75] Inventors: Kimio Kawatani, Suita; Takashi Fujikawa, Kyoto; Eiji Watanabe, Osaka, all of Japan

[73] Assignee: Arakawa Kagaku Kogyo Kabushiki Kaisha, Osaka, Japan

[21] Appl. No.: 576,987

[22] Filed: Feb. 6, 1984

[51] Int. Cl.$^4$ .......................... C09K 3/00; D21F 11/00
[52] U.S. Cl. .............................. 106/287.24; 162/158; 252/174.21; 252/174.22
[58] Field of Search ........................... 106/287.24, 238; 162/158; 252/DIG. 1, 174.21, 174.22

[56] References Cited

U.S. PATENT DOCUMENTS 4,088,598  5/1978  Williams .............................. 252/99

FOREIGN PATENT DOCUMENTS 2532888  2/1977  Fed. Rep. of Germany ...... 162/158

Primary Examiner—Theodore Morris
Attorney, Agent, or Firm—Armstrong, Nikaido, Marmelstein & Kubovcik

[57] ABSTRACT

A self-emulsifying sizing composition comprising at least one substituted succinic anhydride, and at least one member selected from the group consisting of an acetylated polyoxyethylene sorbitan fatty acid ester and a polyoxyethylene compound as a dispersing agent. The composition can simultaneously satisfy the dispersibility in water, the storage stability and the sizing effect, and is suitable for use in neutral paper making.

1 Claim, No Drawings

SELF-EMULSIFYING SIZING COMPOSITION

BACKGROUND OF THE INVENTION

The present invention relates to a sizing composition for paper making, and more particularly to an internal sizing composition having an excellent self-emulsifying property suitable for use in neutral paper making.

Hitherto, as a sizing agent for use in paper making, there have been broadly used various sizing agents, for example, sizing agents prepared from natural rosin or denatured rosin and the like, and particularly fortified rosin sizing agents prepared by saponifying the addition reaction product of rosin and maleic acid.

These sizing agents are employed in acid sizing method in which they are fixed to paper fibers by aluminum sulphate. However, the acid sizing method has a number of drawbacks that devices or machines employed in paper making are corroded and that strength and durability of the obtained paper deteriorates because of pH drop in pulp slurry due to employment of aluminium sulphate which is an essential component in paper making by the acid sizing method.

Also, there is little hope that the cost of paper making is lowered largely because cheap alkaline fillers such as calcium carbonate are difficult to use in the acid sizing method.

For the purpose of eliminating such drawbacks of the acid sizing method, a neutral paper making method in which aluminium sulfate is not employed was studied and there have been proposed neutral sizing agents capable of imparting an excellent sizing effect to a paper under a papr making condition in neutral region. Examples of such a neutral sizing agent are, for instance, a sizing agent containing cyclic dicarboxylic acid anhydride described in Japanese Examined Patent Publication (Tokkyo Kokoku) No. 2305/1964, a sizing agent prepared by addition reaction of an olefin having a double bond at its inner part and maleic anhydride described in Japanese Examined Patent Publication No. 28526/1978 and a sizing agent consisting of substituted dicarboxylic acid anhydride, polyoxyalkylene compound and water described in Japanese Examined Patent Publication No. 36044/1978 and the like.

However, both sizing agents described in Japanese Examined Patent Publications No. 2305/1964 and No. 28526/1978 have many limitations in order to disperse the dicarboxylic acid ayhydride in water as clearly understood from the description in Japanese Examined Patent Publication No. 36044/1978. They can be dispersed in water only when protective colloids which are emulsifiers such as cationic starch, gelatine and polyvinylalcohol are added, and a special device for violent agitation such as high-speed vibrator, mechanical homogenizer or ultrasonic wave homogenizer is used.

There is described in Japanese Examined Patent Publication No. 36044/1978 that the emulsifying process employing such a violent agitator can be omitted by using polyoxyalkylene compound as a surfactant in combination with the substituted dicarboxylic acid anhydride. Thus, in case of dispersing the substituted dicarboxylic acid anhydride in water with usage of a surfactant described in Japanese Examined Patent Publication No. 36044/1978 such as polyoxyalkylene alkyl ether or polyoxyalkylene alkylaryl ether, emulsification can be achieved only by passing the admixture containing the substituted dicarboxylic acid anhydride through a pulp-mixing aspirator or orifices without agitating violently.

However, admixture of the substituted dicarboxylic acid anhydride and the above-mentioned surfactant has a tendency to lower its dispersibility in water as passage of time and thus, a tendency of lowering its sizing effect.

Also, when polyoxyalkylene alkyl diester is used as a surfactant as described in Japanese Examined Patent Publication No. 36044/1978, an admixture containing the diester does not have such a drawback of lowering sizing effect with passage of time as an admixture in which polyoxyalkylene alkyl ether or polyoxyalkylene alkyl aryl ether is added. But, polyoxyalkylene alkyl diester has another drawback that the ester is not easily dispersed in water by normal mixing operation because the ester has many carbon atoms in its alkyl group and thus, is a strong hydrophobicity.

Therefore, as easily understood from the above description, any dispersing agent disclosed in the above Publications cannot be used preferably.

The well-known neutral sizing agents cannot simultaneously satisfy the dispersibility in water, the storage stability and the sizing effect.

Consequently, an acid paper making method employing the fortified rosin sizing agent is still mainly conducted.

The object of the present invention is to provide a neutral sizing composition suitable for use in paper making which solves the above-mentioned problems and can be employed preferably in practical use comparing favorably with the fortified rosin sizing agent.

SUMMARY OF THE INVENTION

It has now been found that a neutral sizing composition into which a specific surfactant is added can simultaneously satisfy the dispersibility in water, the storage stability and the sizing effect.

In accordance with the present invention, there is provided a self-emulsifying sizing composition comprising:

(A) at least one member selected from the group consisting of;

a substituted succinic anhydride having a linear or branched substituent of the formula (I):

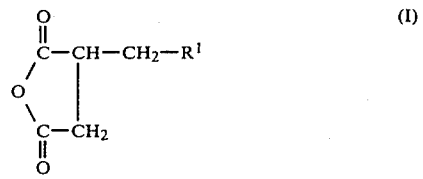

wherein $R^1$ is an alkyl or alkenyl group having 9 to 23 carbon atoms, and a substituted succinic anhydride of the formula (II):

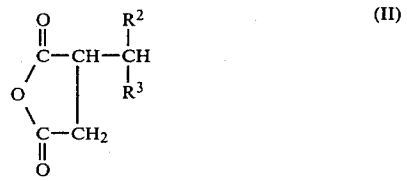

wherein $R^2$ is an alkyl group having 1 to 27 carbon atoms, $R^3$ is an alkyl or alkenyl group having 2 to 28 carbon atoms and a total number of carbon atoms in $R^2$ and $R^3$ is 9 to 29, and (B) at least one member selected from the group consisting of:

an acetylated polyoxyethylene sorbitan fatty acid ester, and a polyoxyethylene compound of the formula (III):

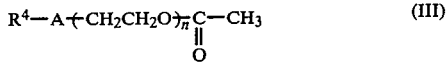 (III)

wherein $R^4$ is an alkyl group having 8 to 20 carbon atoms, n is an integer from 3 to 30 and A is oxygen atom, phenyleneoxy group or

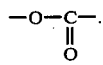

DETAILED DESCRIPTION

A substituted succinic anhydride of the formula (I) usable in the present invention is obtained by addition reaction of linear or branched α-olefin and maleic anhydride.

Examples of such a substituted succinic anhydride are, for instance, iso-octadecenyl succinic anhydride, n-hexadecenyl succinic anhydride, dodecenyl succinic anhydride, triiso-butenyl succinic anhydride and the like. A substituted succinic anhydride having saturated substituent obtained by hydrogenation of the above-mentioned substituted succinic anhydride having unsaturated substituent is also employed.

A substituted succinic anhydride of the formula (II) is obtained by addition reaction of olefin having a double bond at its inner part and maleic anhydride.

Examples of such an olefin are preferably linear inner olefins, for instance, decene-5, dodecene-6, tetradecene-7, hexadecene-7, octadecene-9, eicocene-11 and the like. Both substituted succinic anhydride having saturated substituent and substituted succinic anhydride having unsaturated substituent are employed in the present invention.

The addition reaction of α-olefin or olefin having a double bond at its inner part and maleic anhydride is carried out with or without catalyst, preferably under an inert atmosphere at atmospheric or elevated pressure. Reaction temperature is 180° to 250° C., preferably 190° to 220° C. and reaction period is 1 to 50 hours, preferably 10 to 36 hours.

Molar ratio of maleic anhydride and the olefins employed in the addition reaction is not limited. Maleic anhydride is generally used in an amount of 0.4 to 2 moles, preferably 0.8 to 1.3 moles per 1 mole of the olefins.

The substituted succinic anhydride can be obtained by distilling away unreacted olefins and maleic anhydride.

Specific dispersing agent essentially necessary for the present invention is limited to at least one member selected from the group consisting of acetylated polyoxyethylene sorbitan fatty acid ester and polyoxyethylene compound of the formula (III).

The acetylated polyoxyethylene sorbitan fatty acid ester can be prepared as follows. At first, sorbitan, i.e. a mixture of 1,4-sorbitan and 3,6-sorbitan which are one-molecule dehydrated compound of sorbitol and obtained by intramolecular dehydration of sorbitol, and 1,4,3,6-sorbide which is two-molecule dehydrated compound of sorbitol and obtained by intramolecular dehydration of sorbitol is subjected to esterification reaction with fatty acid to give sorbitan fatty acid ester. Then, the obtained ester is subjected to addition reaction with ethylene oxide. Finally, acetylation of terminal hydroxyl group of the reacted compound is carried out with acetic anhydride to give the object compound. The fatty acid used in the above procedure is saturated or unsaturated fatty acid having carbon atoms of 8 to 20, preferably 10 to 18. Number of added ethylene oxide molecules per one side chain of a sorbitan fatty acid ester is generally in a range of 3 to 30, preferably 5 to 20.

In the above-mentioned esterification reaction, di-esterificatied and tri-esterificated compound are formed as by-products in addition to mono-esterificated compound as main product. Consequently, the acetylated polyoxyethylene sorbitan fatty acid ester is produced, as long as conventional industrial process is employed, as a mixture of mono-, di- or tri-ester of acetylated polyoxyethylene sorbitan fatty acid.

Although mono-ester of acetylated polyoxyethylene sorbitan fatty acid is preferable for use in the present invention, a mixture containing di-ester and tri-ester of acetylated polyoxyethylene sorbitan fatty acid can be employed in the present invention without any disadvantage.

According to the present invention, the dispersing agent is required to have no hydroxyl groups and to have adequate hydrophilic property. A mixture of such a dispersing agent and the substituted succinic anhydride of the formula (I) and/or (II) is chemically so stable that a ring cleavage of the substituted succinic anhydride does not occur and thus, water-dispersibility of the mixture does not change with passage of time. Such a dispersing agent is superior in self-emulsifying property because of its adequate hydrophilic property. Consequently, a smaller amount of the dispersing agent is effective in comparison with the conventional dispersing agent such as polyoxyalkylene alkyl ether or polyoxyalkylene alkylaryl ether. Therefore, problems encountered at a time of using a conventional dispersing agent such as bubbling can be eliminated.

Anionic surfactants such as potassium, sodium and calcium dodecylbenzenesulfonate and laurylsulfate can also be used simultaneously in combination with the dispersing agent of the present invention.

The self-emulsifying sizing composition of the present invention can be employed in paper making by a manner that a desired amount of aqueous dispersion of the sizing composition is added to a pulp slurry or a desired amount of the sizing composition is added to a pulp slurry simultaneously with the addition of water in desired proportion. For a purpose of improving a fixing property of the sizing agents against pulp, for example, polyethyleneimine resin, cationic polyacrylamide resin, cationic polyamidepolyamine resin and derivatives of cationic starch can also be employed in the composition.

The present invention is more specifically described and explained by means of the following Examples. It is to be understood that the present invention is not limited to the Examples, and various changes and modifications may be made in the invention without departing from the spirit and scope thereof.

In the Examples, the sizing effect of the composition of the present invention was investigated according to the following testing method.

Sizing Effect

To a 1% slurry of a L-BKP pulp beaten to 450 ml of Canadian standard freeness were added polyamidepolyamine resin (commercially available under the commercial name "Arafix 100" made by Arakawa Kagaku Kogyo Kabushiki Kaisha) in an amount of 0.3% (calculated as solid matter) based on the weight of the pulp as a fixing agent and the sizing composition obtained in the Example in an amount of 0.2 or 0.5% (calculated as solid matter) based on the weight of the pulp. After uniformly dispersing, the slurry was subjected to paper making by using a TAPPI standard sheet machine to give a sheet having a basis weight of $60\pm1$ g/m$^2$. The obtained wet sheet was pressed to dehydrate and then dried at 100° C. for 1 minute. After conditioning at a relative humidity of 65% for 24 hours, the sheet was subjected to the measurement of the sizing degree (second) according to a Stoeckight method.

Also, the following Reference Examples are presented to illustrate the preparation of substituted succinic acids as used in the present invention.

REFERENCE EXAMPLE 1

An alkenyl-substituted succinic anhydride was prepared by addition reaction of maleic anhydride with branched α-olefins having 14 carbon atoms.

REFERENCE EXAMPLE 2

An alkenyl-substituted succinic anhydride was prepared by addition reaction of maleic anhydride with isobutylene oligomer having 20 carbon atoms.

REFERENCE EXAMPLE 3

An alkenyl-substituted succinic anhydride was prepared by addition reaction of maleic anhydride with tetradecene-7.

REFERENCE EXAMPLE 4

An alkenyl-substituted succinic anhydride was prepared by addition reaction of maleic anhydride with eicocene-11.

REFERENCE EXAMPLE 5

An alkenyl-substituted succinic anhydride was prepared by addition reaction of maleic anhydride with octadecene-9.

EXAMPLE 1

There were well admixed 10 g of the alkenyl-substituted succinic anhydride obtained in Reference Example 1 and 1 g of the emulsifier of the acetylated polyoxyethylene sorbitan fatty acid ester shown in Table 1.

1 g of the obtained admixture was collected in a bottle of 100 ml and 86 g of water was added. The admixture was emulsified by shaking the bottle lightly to give a sizing agent.

EXAMPLES 2 TO 11

The procedures of Example 1 were repeated except that substituted succinic anhydrides and dispersing agents shown in Table 1 were employed to give sizing agents by emulsifying the admixtures.

Self-emulsifying property of the sizing agents obtained in Examples 1 to 11 was measured just after the preparation and at 7 days after the preparation. The results are shown in Table 1, in which Sorgen TW-20 and Sorgen TW-60, employed in Example 10 and 11, respectively are emulsifier of sorbitan fatty acid ester made by Dai-ichi Kogyo Seiyaku Kabushiki Kaisha.

TABLE 1

| Substituted succinic anhydride | Dispersing agent | Self-emulsifying property just after the preparation | 7 days after the preparation | Sizing effect (sec) 0.2% | 0.5% |
|---|---|---|---|---|---|
| Ex. 1 Ref. Ex. 1 | acetylated polyoxyethylene sorbitan fatty acid ester (structure shown) | good | good | 10 | 25 |
| Ex. 2 Ref. Ex. 2 | " | good | good | 15 | 30 |
| Ex. 3 Ref. Ex. 3 | " | good | good | 12 | 29 |
| Ex. 4 Ref. Ex. 4 | " | good | good | 20 | 35 |
| Ex. 5 Ref. Ex. 5 | " | good | good | 19 | 34 |
| Ex. 6 Ref. Ex. 5 | $C_{12}H_{25}-O(CH_2CH_2O)_{14}-C(=O)-CH_3$ | good | good | 18 | 32 |
| Ex. 7 Ref. Ex. 5 | $C_9H_{19}-C_6H_4-O(CH_2CH_2O)_{18}-C(=O)-CH_3$ | good | good | 18 | 32 |

Structure for Ex. 1–5 dispersing agent:

$$\begin{array}{c} H_2C\!-\!O\!-\!CH\!-\!CH_2\!-\!O\!-\!C(=O)\!-\!C_{12}H_{25} \\ HC\!-\!CH\!-\!O(CH_2CH_2O)_{10}\!-\!C(=O)\!-\!CH_3 \\ \text{(sorbitan ring with H, O)} \\ O\!-\!(CH_2CH_2O)_{10}\!-\!C(=O)\!-\!CH_3 \\ CH_3\!-\!C(=O)\!-\!(OCH_2CH_2)_{10} \end{array}$$

TABLE 1-continued

| Substituted succinic anhydride | Dispersing agent | Self-emulsifying property just after the preparation | Self-emulsifying property 7 days after the preparation | Sizing effect (sec) 0.2% | Sizing effect (sec) 0.5% |
|---|---|---|---|---|---|
| Ex. 8 Ref. Ex. 5 | 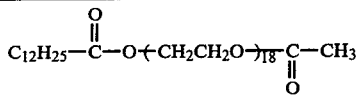 | good | good | 18 | 32 |
| Ex. 9 Ref. Ex. 5 | 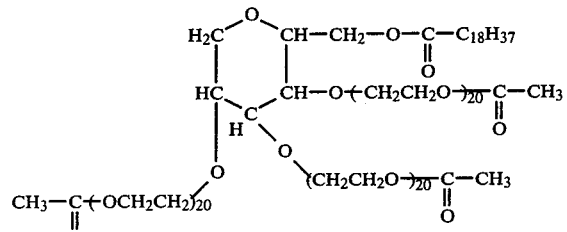 | good | good | 18 | 32 |
| Ex. 10 Ref. Ex. 5 | Acetylated Sorgen TW-20 | good | good | 16 | 35 |
| Ex. 11 Ref. Ex. 5 | Acetylated Sorgen TW-60 | good | good | 14 | 32 |

What we claim is:

1. A self-emulsifying sizing composition comprising:
(A) at least one member selected from the group consisting of; a substituted succinic anhydride having a linear or branched substituent of the formula (I):

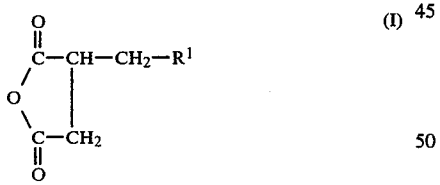

wherein $R^1$ is an alkyl or alkenyl group having 9 to 23 carbon atoms, and a substituted succinic anhydride of the formula (II):

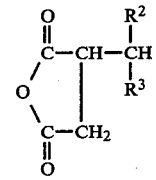

wherein $R^2$ is an alkyl group having 1 to 27 carbon atoms, $R^3$ is an alkyl or alkenyl group having 2 to 28 carbon atoms and a total number of carbon atoms in $R^2$ and $R^3$ is 9 to 29, and (B) at least one member selected from the group consisting of: an acetylated polyoxyethylene sorbitan fatty acid ester, and a polyoxyethylene compound of the formula (III):

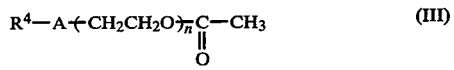

wherein $R^4$ is an alkyl group having 8 to 20 carbon atoms, n is an integer from 3 to 30 and A is oxygen atom, phenyleneoxy group or

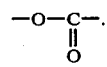

* * * * *